April 1, 1952      K. RASMUSSEN      2,591,099
INTERNAL-COMBUSTION ENGINE
Filed Nov. 18, 1946
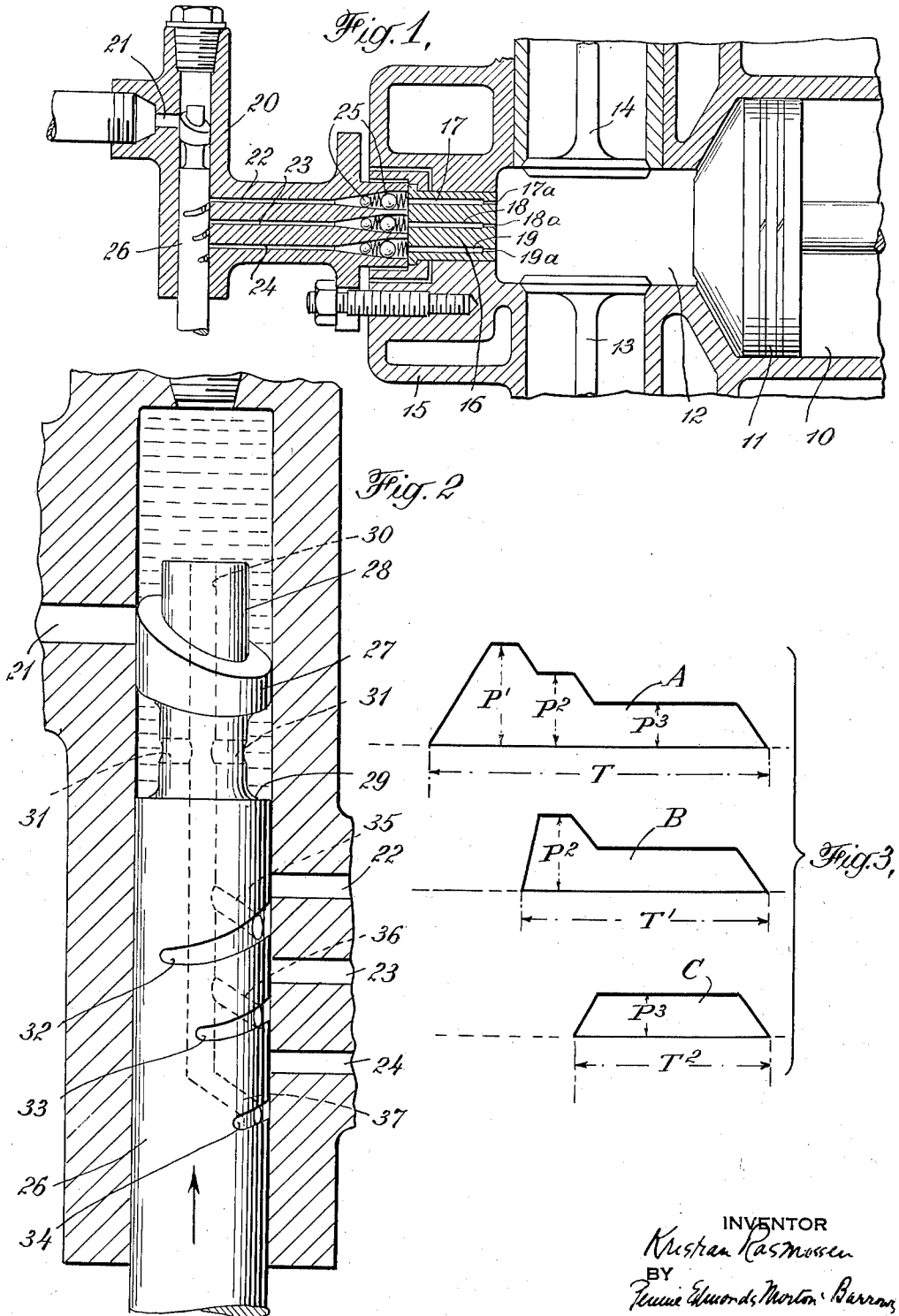
INVENTOR
Kristian Rasmussen
BY
Pennie Edmonds Morton & Barrows
ATTORNEYS Patented Apr. 1, 1952

2,591,099

UNITED STATES PATENT OFFICE 2,591,099

INTERNAL-COMBUSTION ENGINE

Kristian Rasmussen, Copenhagen, Denmark

Application November 18, 1946, Serial No. 710,553
In Denmark March 16, 1940

Section 1, Public Law 690, August 8, 1946
Patent expires March 16, 1960

9 Claims. (Cl. 123—32)

1

This invention relates to internal combustion engines operated with liquid fuel, such as oil, which is injected into the engine cylinder under pressure and is atomized during such injection. More particularly, the invention is concerned with a novel method of injection of the fuel into the cylinder of such an engine and with an engine constructed for operation in accordance with that method.

In internal combustion oil engines, it is the common practice to inject each charge of oil into the cylinder at high velocity and pressure and without interruption throughout the entire injection period. When this method of injection is used, the lag in ignition is such that a substantial proportion of the charge enters the cylinder before ignition commences and, upon ignition of the charge, a sharp increase in the pressure in the cylinder occurs. The ignition lag depends on the time required for heating the droplets of oil and it will, accordingly, be apparent that the proportion of the charge that enters the cylinder before ignition and the consequent pressure increase within the cylinder following ignition vary directly with engine speed and will be most pronounced in high speed engines operating with high power output. Because of the high combustion pressure occurring in present engines, it is necessary to employ parts of great strength and weight and the required heavy construction limits operating speeds and results in engine vibration.

In order to avoid the objectionable features above set forth, it has been proposed to inject each charge of fuel into the cylinder of an internal combustion engine in two stages with a relatively long interval between stages necessitated by the design of the pump. While some improvements in results is obtained by this method of injection, the regulation of combustion is difficult by reason of the interval between the stages, and, in high speed operation in which the time for combustion is very short, the result generally is that combustion occurs too early and before sufficient heat from compression is available for rapid burning. Also, the injection operation does not end soon enough with the result that combustion continues too long and there is excessive heat generation, which detrimentally affects the piston and cylinder. Also, in some cases, there may be incomplete combustion with consequent waste of fuel, smoking exhaust, and the deposition of carbon, which tends to clog the spray orifices.

The present invention is directed to the provision of a method for the injection of fuel in

2 an internal combustion oil engine which overcomes the difficulties above pointed out and involves injecting each charge of fuel without interruption at a substantially constant rate but at decreasing pressure. Preferably, the pressure of the oil at the point of injection is lowered in a plurality of stages and this result is obtained by increasing in a plurality of stages the areas of the orifices through which the oil is injected into the cylinder. Accordingly, during the first stage of injection, the oil is fed into the cylinder at a high pressure with consequent fine atomization and reduction in ignition lag, while, in subsequent stages, the injection takes place at a lower pressure with consequent coarser atomization and slower burning of the fuel. The result is that the maximum combustion pressure within the cylinder is lower than that developed when present methods of injection are used and the engine need not be of so heavy construction to withstand the pressure.

The changes in the effective area of the spray orifices may be brought about in various ways, as for example, by using a plurality of orifices connected by passages to the cylinder of the injection pump. The outlets from the pump cylinder to the passages are controlled by the piston of the pump and the construction and mode of operation are such that, in the initial part of each delivery stroke of the pump, less than all of the passages are open and thereafter more passages are open than in the initial stage. With this arrangement, the rate at which the oil is delivered remains substantially constant, but as the number of passages open for injection of the oil increases, the pressure, at which the oil is injected, falls.

For a better understanding of the invention, reference may be had to the accompanying drawing, in which:

Fig. 1 is a fragmentary sectional view through one form of engine and injection pump suitable for practicing the new method;

Fig. 2 is a longitudinal sectional view of the pump shown in Fig. 1, on an enlarged scale; and Fig. 3 is a diagram showing the oil pressure at different stages in the operation of the engine shown in Fig. 1.

The engine illustrated includes a cylinder 10 containing a piston 11 and having a combustion chamber 12 with the usual inlet and exhaust ports controlled by valves 13, 14. The cylinder head 15 is provided with an opening containing a block 16, through which extend passages 17, 18, 19, terminating, respectively, in spray orifices 17a, 18a, and 19a, leading into the combustion chamber.

Fuel is supplied to the cylinder by a pump which is mounted on the cylinder head and includes a casing 20 having an oil inlet 21 and oil outlet passages 22, 23, 24, leading, respectively, to the passages 17, 18, 19. Each of the passages 22, 23, 24, is provided with a portion of enlarged diameter, within which are seated spring pressed balls 25 acting as check valves to prevent the return of fuel from the cylinder head to the interior of the pump casing.

The piston or plungers 26 of the pump is generally cylindrical in form and reciprocated by any usual means. At its end adjacent the inlet, the plunger has a valve portion 27, beyond which the plunger has a portion 28 of reduced diameter. Below the main valve portion 27, the plunger is formed with an annular groove 29. A central passage 30 leads through the plunger from the end thereof and communicates through radial passages 31 with the interior of the groove 29. Below the groove 29, the cylindrical surface of the plunger is formed with somewhat helical grooves 32, 33, 34, and passages 35, 36, 37 lead from the passages 30 to the respective grooves 32, 33, 34. The spacings between grooves 32 and 33 and between grooves 33 and 34 are such that when the plunger moves upwardly, groove 32 begins to communicate with passage 22 before groove 33 is open to passage 23. Similarly, groove 33 is open to passage 23 before groove 34 is open to passage 24. The width of the respective grooves 32, 33, and 34 is such that, when groove 34 is open to passage 24, grooves 32 and 33 are also open to their passages 22 and 23.

In the operation of the engine described, the downward movement of the plunger of the pump causes the valve portion 27 of the plunger to pass beyond the open inlet passage 21, whereupon a quantity of oil enters the chamber within the pump casing above the plunger. When the plunger starts upwardly, some of the oil is forced through the passage 30 into the space within the groove 29 and, at this time, grooves 32, 33, and 34 are out of registry with their respective passages 22, 23, 24. When the plunger reaches the position illustrated in Fig. 2, the inlet 21 is cut off by the valve portion 27 and further upward movement of the plunger causes pressure to be applied to the oil trapped within the pump cylinder above the plunger and within groove 29. At this instant, however, groove 32 begins to come into registry with its passage 22, so that oil escapes from the space above the plunger and flows through passage 30 to groove 32 and thence into passage 22. The oil flows through the passage, the check valve, and passage 17, and escapes through the spray orifice 17a at a high pressure, so that the oil is finely atomized and heating of the droplets to ignition temperature takes only a short time.

As the pump plunger continues its upward movement, groove 33 begins to register with passage 23, so that oil is supplied to the orifice 18a, while the registry of groove 32 with passage 22 continues. The total quantity of oil injected through the two spray orifices 17a, 18a remains substantially constant, but the pressure of injection decreases, when the second spray orifice comes into action. Upon further upward movement of the pump, the third groove 34 begins to register with its passage 24, so that oil is then injected through all three spray orifices 17a, 18a, and 19a, and a further reduction in injection pressure results, although the rate of oil flow remains substantially constant. As the pressure decreases in the second and third stages of injection, the size of the droplets of the injected oil increases and slow burning results. When the lower edge of the valve portion 27 of the plunger passes by the lower edge of the inlet 21, oil may escape from the space below the valve portion into the inlet and, at that instant, the grooves 32, 33, 34 may pass out of registry with their respective passages 22, 23, 24, so that the injection will cease. It is preferable, however, to form the grooves 32, 33, 34, so that they will not close their respective passages simultaneously with the opening of inlet 21, but shortly thereafter. When the passages are thus closed after the opening of the inlet, the oil pressures in the passages and in the inlet come into equilibrium. The passages are, of course, closed before the plunger reaches the top of its upward stroke.

It will be noted that the valve portion 27 of the pump plunger is of varying length circumferentially of the plunger and the arrangement is such that, by partial rotation of the plunger, the time interval between opening and closing of the inlet may be varied. Grooves 32, 33, 34, are of somewhat helical form, so that they function as described, regardless of the rotational adjustment of the plunger.

Fig. 3 illustrates diagrammatically the changes in pressure of the injected oil during a single period of injection with the apparatus described. In the diagram, the time of the injection period is represented horizontally and the pressures are represented vertically. The figure A illustrates the pressure at orifice 17a and its form shows that, at the start of the injection period, the pressure of the injected oil raises sharply until a maximum P' is reached. When the orifice 18a comes into operation as represented by the figure B, the pressure at orifice 17a falls to the value $P^2$, and the pressure at the orifice 18a reaches a maximum value of $P^2$. When the third orifice 19a, represented by figure C, comes into operation, the pressure at the orifices 17a and 18a falls to the value $P^3$ and the pressure at orifice 19a reaches $P^3$ as a maximum. As shown by the diagram, orifice 17a remains effective throughout the entire injection period T, while orifice 18a is effective through a less part T' of the period and orifice 19a is effective for a still less part $T^2$ of the period.

In the construction illustrated, three spray orifices are used, and the passages thereto are opened consecutively and closed simultaneously. If desired, more than three orifices may be employed and they may be opened otherwise than consecutively, as, for example, six orifices may be employed with the first two opened one after another, and the other four opened simultaneously after the first two. Similarly, oil may be supplied to a pair of orifices one after another and then to a group of orifices, with the supply to the first orifice cut off, while the second orifice and the group of orifices are effective. Various other arrangements of the orifices and modes of operation thereof may be employed, as desired.

I claim:

1. A method of operating an internal combustion engine having a cylinder to be supplied with liquid fuel in successive charging periods, which comprises injecting the fuel into the cylinder without interruption during each charging period at a substantially constant rate and under decreasing pressure.

2. A method of operating an internal combustion engine having a cylinder to be supplied with liquid fuel in successive charging periods, which comprises injecting the fuel into the cylinder without interruption during each charging period at a substantially constant rate and under pressure decreasing in steps.

3. A pump for injecting liquid fuel into the cylinder of an internal combustion engine, which comprises a chamber having an inlet for the fuel, a plurality of passages leading from the chamber, and means for applying pressure to liquid fuel within the chamber at a substantially constant rate and forcing it therefrom through the passages, said means controlling the passages to cause the fuel to pass initially through one passage and then through others without interruption, said means cutting off flow through the passages simultaneously.

4. A pump for injecting liquid fuel into the cylinder of an internal combustion engine, which comprises a chamber having an inlet for the fuel, a plurality of passages leading from the chamber and a plunger within the chamber acting to feed fuel and to control said passages so that the fuel is injected into the cylinder without interruption during each pumping stroke of the plunger and initially through less than all the passages and later through more passages than were initially effective.

5. A pump for injecting liquid fuel into the cylinder of an internal combustion engine, which comprises a chamber having an inlet for the fuel, a plurality of passages leading from the chamber, and a reciprocating plunger in the chamber having a portion effective during each delivery stroke of the plunger to close the inlet and another portion effective, when the inlet is closed, initially to open less than all the passages and subsequently to open more of the passages than were initially opened.

6. A pump for injecting liquid fuel into the cylinder of an internal combustion engine, which comprises a chamber having an inlet for the fuel and a plurality of outlets, a passage leading from each outlet, a check valve in each passage, and a plunger reciprocating in the chamber, the plunger having a portion operating during each delivery stroke of the plunger to close the inlet and another portion effective, when the inlet is closed, initially to open less than all the outlets and subsequently to open more of the outlets than were initially opened.

7. A pump for injecting liquid fuel into the cylinder of an internal combustion engine, which comprises a chamber having an inlet for the fuel, a plurality of passages leading from the chamber, and a plunger within the chamber having a portion effective during each delivery stroke to close the inlet and then open it and another portion effective, when the inlet is closed, initially to open less than all the passages, subsequently to open more of the passages than were initially opened, and finally to close all the passages, said portions of the plunger being so constructed that, in said stroke of the plunger, the passages are closed after the inlet is opened.

8. A method of operating an internal combustion engine having a cylinder to be supplied with liquid fuel in successive charging periods, which comprises applying constant pressure to a body of the liquid fuel continuously through each charging period, consecutively opening a plurality of paths between the body and the cylinder to cause a decrease in the pressure at which the fuel enters the cylinder during the charging period, and simultaneously closing all the paths open at the end of the charging period.

9. An internal combustion engine which comprises a cylinder, a plurality of passages leading to the cylinder for injection of liquid fuel into the cylinder, and a pump for forcing the fuel through the passages, said pump including a chamber from which the passages lead and which has an inlet for the fuel, and a reciprocating plunger in the chamber having a portion effective during each delivery stroke of the plunger to close the inlet, a second portion effective, when the inlet is closed, initially to open less than all the passages and later to open more of the passages than were initially opened, and a third portion effective to close simultaneously all the passages finally open.

KRISTIAN RASMUSSEN.

REFERENCES CITED

The following references are of record in the file of this patent:

UNITED STATES PATENTS

| Number | Name | Date |
| --- | --- | --- |
| 2,003,814 | Taylor | June 4, 1935 |
| 2,250,364 | Fiedler | July 22, 1941 |
| 2,306,364 | Skaredoff | Dec. 22, 1942 |

FOREIGN PATENTS

| Number | Country | Date |
| --- | --- | --- |
| 158,626 | Switzerland | Feb. 1, 1933 |